PULSE RATE COMPUTER INCLUDING STORAGE REGISTERS FOR FEEDING BACK PARTIAL RESULTS OF COMPUTATIONS

Filed Aug. 5, 1965 6 Sheets-Sheet 1

INVENTOR.
VINCENT MONTALTO, JR.
BY Bruce C Lutz
ATTORNEY

INVENTOR.
VINCENT MONTALTO, JR.
BY Bruce C Lutz
ATTORNEY

INVENTOR.
VINCENT MONTALTO, JR.
BY Bruce C Lutz
ATTORNEY

INVENTOR.
VINCENT MONTALTO, JR
BY Bruce C. Lutz
ATTORNEY

INVENTOR.
VINCENT MONTALTO, JR
BY Bruce C Lutz
ATTORNEY

INVENTOR.
VINCENT MONTALTO, JR.
BY Bruce C Lutz
ATTORNEY

United States Patent Office 3,564,594

Patented Feb. 16, 1971

3,564,594

PULSE RATE COMPUTER INCLUDING STORAGE REGISTERS FOR FEEDING BACK PARTIAL RESULTS OF COMPUTATIONS

Vincent Montalto, Jr., Fridley, Anoka, Minn., assignor to Honeywell Inc., Minneapolis, Minn., a corporation of Delaware Filed Aug. 5, 1965, Ser. No. 477,370

Int. Cl. G06j *1/00*

U.S. Cl. 235—150.3 14 Claims

ABSTRACT OF THE DISCLOSURE

A pulse rate computer including storage registers arranged in a feedback configuration for feeding back partial results of computations is shown and described.

This invention relates to digital control apparatus and more specifically to computing apparatus wherein numerical values are represented by the number of equally weighted pulses of pulse trains.

In a general purpose digital computer numbers are normally represented in binary notation by serial pulses on a line or pulses on parallel lines. Each pulse or line has a relative weight or value assigned to it in accordance with the positional notation of the binary number system. A pulse rate digital computer, on the other hand, operates upon pulse trains or pulses that have only one relative value or weight. In other words, the number 16 may be represented by 16 consecutive pulses rather than one pulse in the binary $2^4$ position. Pulse rate computers have been used for a variety of applications relating to digital control, some examples of which are flight control systems, process control systems, other types of automatic control systems, and some general digital computations on output data from various devices. In most cases, the pulse rate computer is considered analogous to analog computers but with the accuracy of a digital system. Normally, this type of computer is used to operate on input data in accordance with a formula or function that is built into the hardware. If it is desired to perform a multiplication, an addition, and a second multiplication, the input pulse train is first applied to a first multiplier, then coupled from the first multiplier to an adder, and then coupled from the adder to a second multiplier in much the same way as in an analog system. The prior art pulse rate computers are generally exemplified by a patent to B. M. Gordon, 2,997,-175. The disadvantages, such as duplication, of prior art systems are amply illustrated in Gordon where five binary rate multipliers are used.

Accordingly, it is desirable to have a pulse rate computer that uses a minimum of circuitry. In the prior art systems, if the arithmetic operations are at all complicated, the circuitry to perform the various operations is duplicated many times over. This invention provides a novel pulse rate computer which has a single computing section and utilizes a closed loop feedback system in which partial results are fed back from an output to an input of the computing section.

The feedback loop may contain a means for holding or retaining data for a time, however, the essence of this invention is in the organization of a pulse rate computer with a feedback loop. The feedback loop completes a novel pulse rate computer that is less complicated than prior art pulse rate computers. Because the pulse rate computer is a special purpose computer it is usually designed to solve a specific problem. This invention, however, provides a more general design that is easier to modify to perform a variety of functions because the arithmetic or computing section does not have to be rebuilt for each problem or function. It is only necessary to modify the program and timing section of the computer when a different problem is to be solved, therefore, the basic organization of the computer remains the same.

Accordingly, it is an object of this invention to provide a pulse rate computer with a minimum of circuitry.

It is a further object of this invention to provide a novel method of organizing a pulse rate computer.

These and other objects of this invention will become apparent to those skilled in the art upon a reading of this specification, and the appended claims in conjunction with the drawings, which:

Figure 1:
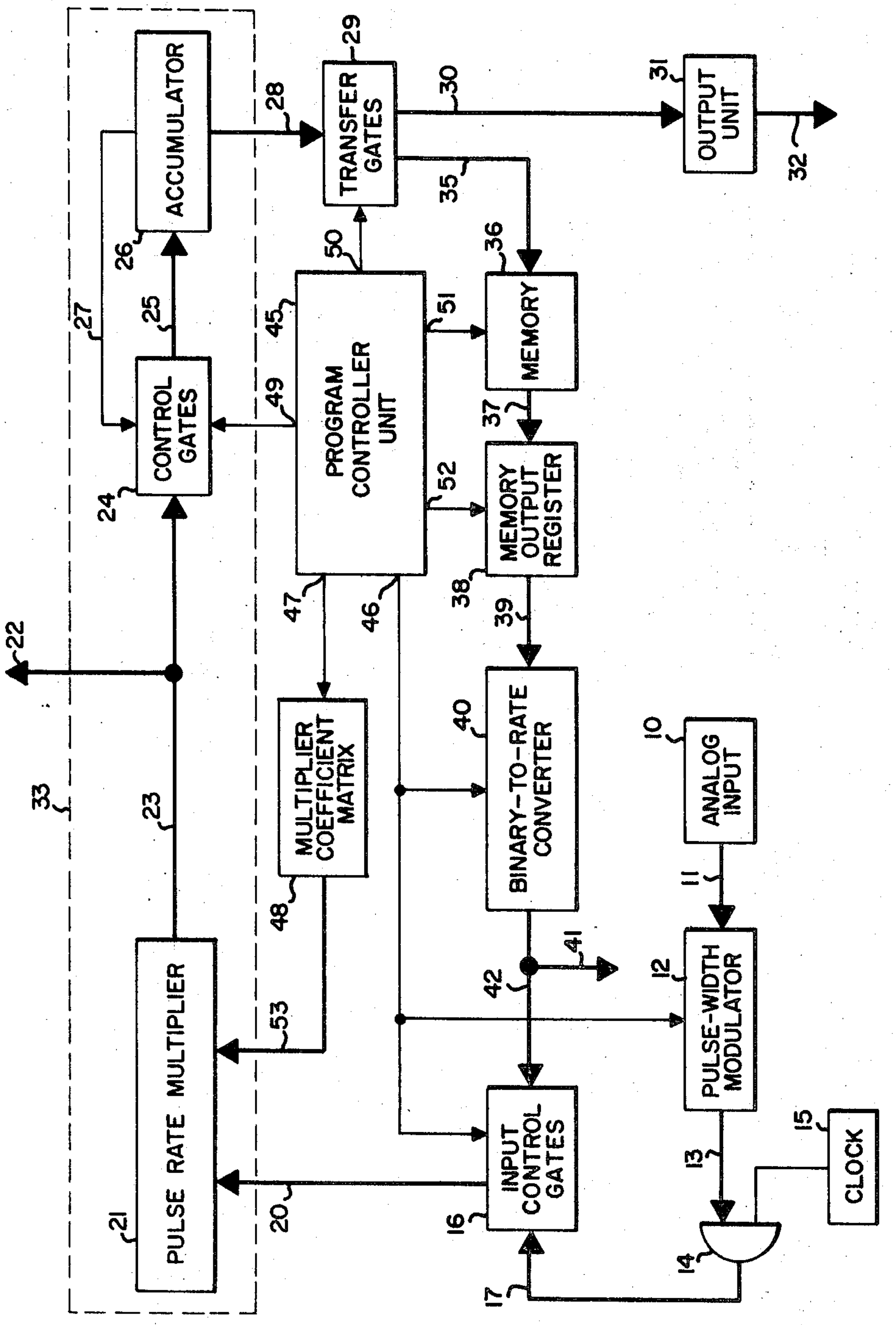
FIG. 1 is a block diagram of one embodiment of this invention.

Referring now to FIG. 1, there is shown an analog input 10 with an output connected to a data flow line 11 which is connected to an input of a pulse width modulator 12. An output of pulse width modulator 12 is connected by a data flow line 13 to one input of an AND gate 14, the other input of which is connected to a clock 15. The output of AND gate 14 is connected by means of a data flow line 17 to one input of input control gates 16, the output of which is connected by a data flow line 20 to an input of a multiplying means or pulse rate multiplier 21. Pulse rate multiplier 21 has an output connected to a data flow line 23 which is further connected to an input of a plurality of gates designated control gates 24, the output of which is connected to a data flow line 25. Data flow line 23 is also connected to an output terminal or means 22. Data flow line 25 is further connected to an input of an accumulator 26. Accumulator 26 has a control output which is connected by a control line 27 to a control input of control gates 24. Another output of accumulator 26 is connected by a data flow line 28 to an input of transfer gates 29. Transfer gates 29 have a first output connected by a data flow line 30 to an output unit 31. An output of output unit 31 is connected to an output data flow line 32. Pulse rate multiplier 21 and accumulator 26 generally comprise a computing means 33. Computing means 33 may include other computing elements and may be rearranged without departing from the spirit of this invention.

Transfer gates 29 have a second output connected by a data flow line 35 to an input of a storage means, data retention means, data storage means, or memory 36. An output of memory 36 is connected by a data flow line 37 to a memory output register 38. An output of memory output register 38 is connected by means of a data flow line 39 to an input of a binary-to-rate converter 40. Binary-to-rate converter 40 has an output connected to a data flow line 42 which is connected to an output terminal or means 41. Data flow line 42 is further connected to a second input of input control gates 16. Memory output register 38, binary-to-rate converter 40, and input control gates 16 generally comprise a gating means, converter means, or transfer means and together with memory 36 comprise a feedback means.

A control means or program controller unit 45 has as output 46 which is connected to a control input of the binary-to-rate converter 40, to a control input of pulse width modulator 12, and to a control input of input control gates 16. Program controller unit 45 further has an output 47 connected to a generating means or multiplier coefficient matrix 48, an output 49 connected to a second control input of control gates 24, an output 50 connected to a control input of transfer gates 29, an output 51 connected to a control input of memory 36, and an output 52 connected to a control input of memory output register 38. Multiplier coefficient matrix 48 supplies a binary coded multiplier at an output terminal connected to data flow line 53 which is further connected to a second input of pulse rate multiplier 21. The program controller unit 45 generally comprises a control means or program control means to control the operation of the various circuit elements.

The operation of FIG. 1 will be described more fully after the remaining figures have been described.

Figure 5A:
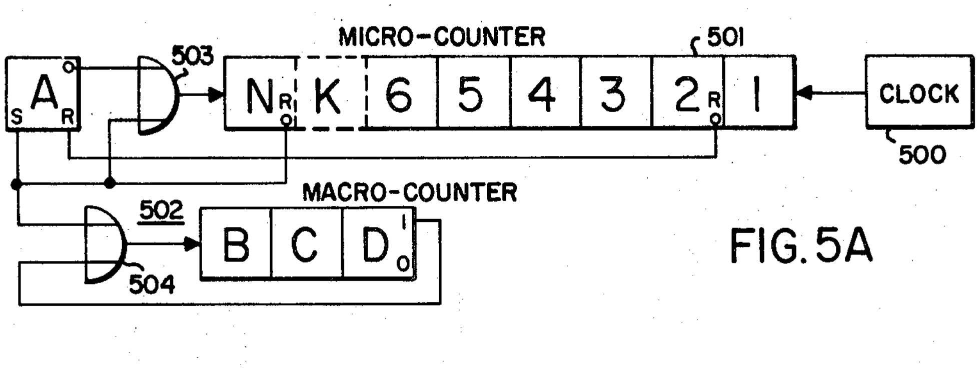
FIG. 5A is a block diagram and logic diagram of a portion of a program controller unit.
Figures 2A, 5B, 5C:
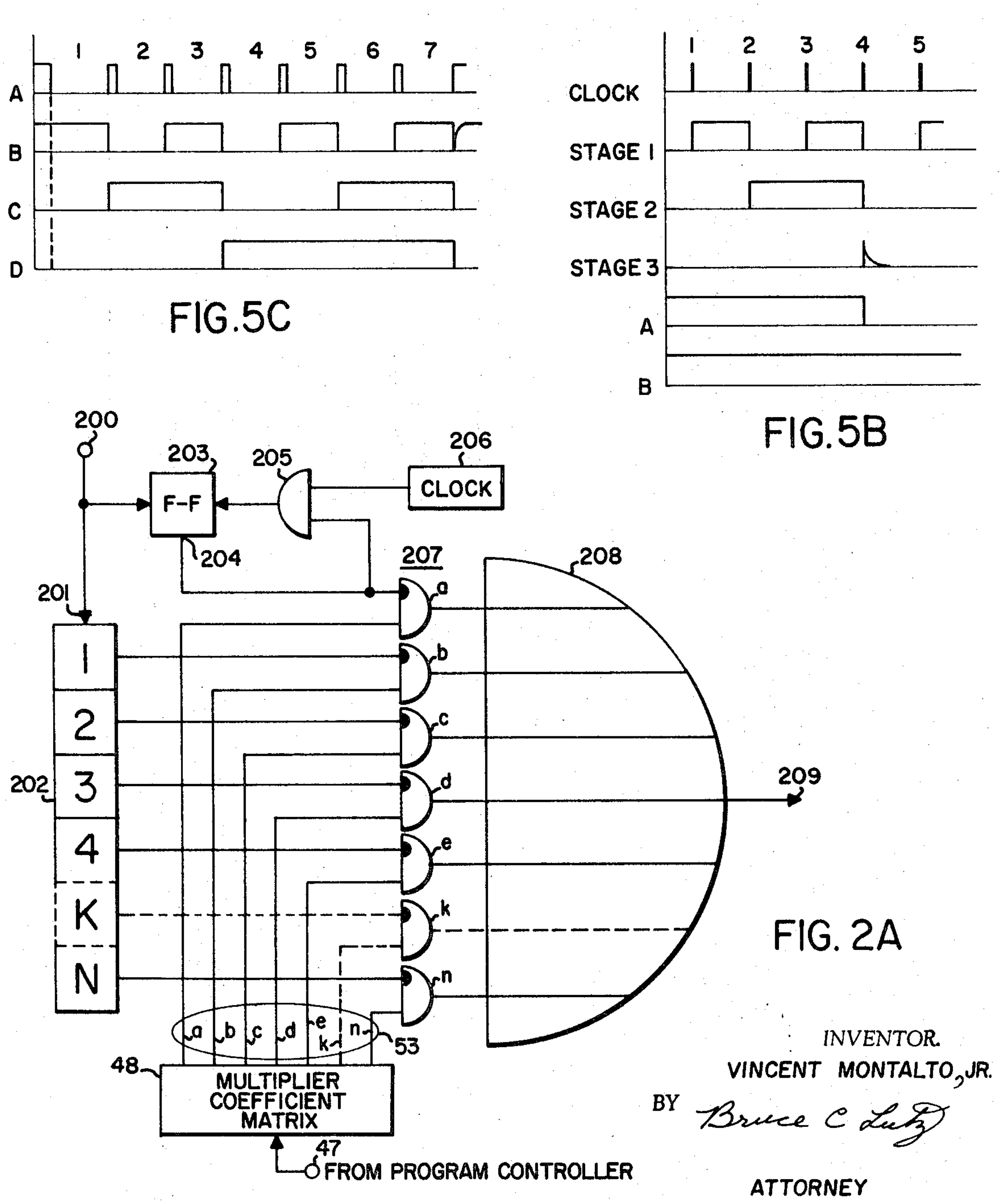
FIG. 2A is a logic diagram of a pulse rate multiplier.
FIGS. 5B and 5C are timing diagrams to aid in the explanation of FIG. 5A.

FIG. 2A illustrates a pulse rate multiplier that may be used for the pulse rate multiplier 21 of FIG. 1. Alternatively, the pulse rate multiplier shown in a patent to J. J. Pariser et al. 3,126,476 may be substituted for the pulse rate multiplier 21. Various other alternatives are available and will be obvious to those skilled in the art. In FIG. 2A there is shown an input terminal 47 which corresponds to the output terminal 47 of program controller unit 45. Input terminal 47 is shown as being connected to an input of multiplier coefficient matrix 48. The output from multiplier coefficient 48 is connected to a data flow line 53 which is comprised of parallel lines on which voltages representing ones and zeros are applied to the multiplier. These lines are labeled *a, b, c, d,* and *e* for the five lowest order binary digits, respectively, in the number representing the multiplier. The length of the binary word is not important to this invention, therefore, a dotted line labeled *k* is included in the data flow line 53 to represent an arbitrary number of digital positions. The most significant digit included in data flow line 53 is carried on line *n*.

An input terminal 200 of FIG. 2A corresponds to the input of pulse rate multiplier 21 connected to data flow line 20. Input terminal 200 is connected to an input terminal 201 of a counter 202. Counter 202 has an arbitrary number of stages which is illustrated by showing stage K in dotted lines. Input terminal 200 is further connected to one input of a flip-flop 203 which has an output 204. Output 204 is connected to one input of an AND gate 205 the output of which is connected to a second input of flip-flop 203. The second input of AND gate 205 is connected to a clock 206. There is further shown a series of pulsed AND gates 207. The AND gates 207 are labeled *a, b, c, d, e, k,* and *n*. The gates are called pulsed AND gates because they form an output pulse upon the occurrence of either a trailing edge or a leading edge of a signal applied to one of the input terminals to the AND gate. The pulsed input terminal is designated by a dot. The specific embodiment shown in FIG. 2A uses AND gates that trigger upon the occurrence of a trailing edge of an output pulse from counter 202. The symbol *k* represents an arbitrary number of AND gates corresponding to the number K of stages of counter 202. AND gate 207*a* has a first input connected to output line 53*a* from multiplier coefficient matrix 48 and a second input connected to output terminal 204 of flip-flop 203. In a similar manner AND gate 207*b* is connected to line 53*b* and to the lowest order stage of counter 202 or counter stage 1. The rmaining AND gates 207*c*–207*n* are connected to corresponding lines 53*c*–53*n* and also to corresponding counter stages of counter 202. The various outputs of AND gates 207 are connected to inputs of OR gate 208, the output of which is connected to an output terminal 209.

Figure 2B:
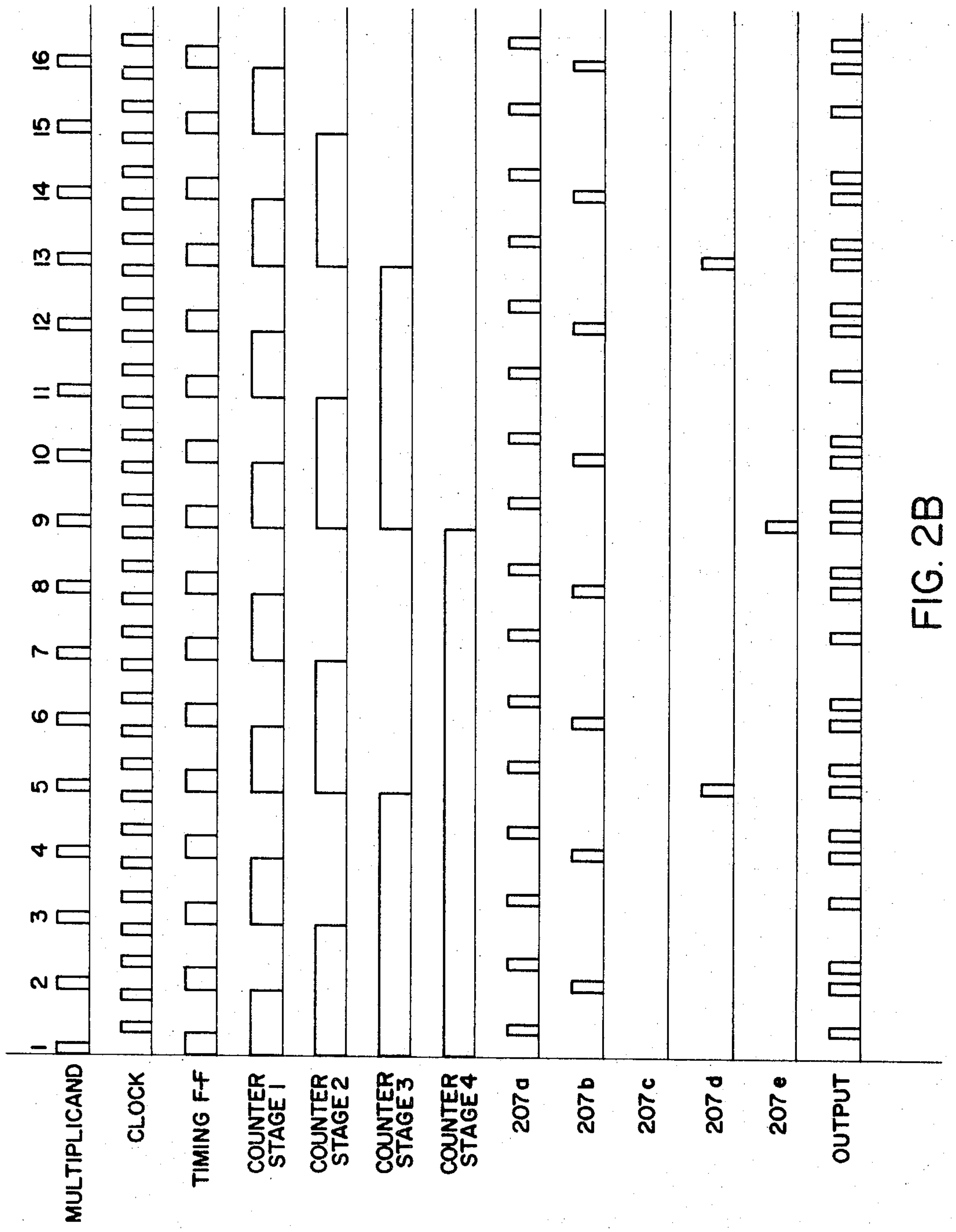
FIG. 2B is a timing diagram to aid in the explanation of the operation of the multiplier shown in FIG. 2A.

FIG. 2B shows a timing diagram to illustrate the multiplication of two particular numbers in the multiplier of FIG. 2A. The numbers to be multiplied in this example are 16 and 1.6875. The number 1.6875 equals 1.1011 in binary notation. Assume that a five place pulse rate multiplier is used. The multiplier 1.1011 is generated by the multiplier coefficient matrix 48 upon a signal from the program controller unit 45. This number is represented by a voltage representing a "1" on lines 53*a*, 53*b*, 53*d*, and 53*e* and a voltage representing a "0" on line 53*c*. The voltages representing "1" energize AND gates 207*a*, 207*b*, 207*d*, and 207*e*. AND gate 207*c* remains unenergized. The graph labeled Multiplicand in FIG. 2B is a pulse train of 16 pulses representing the number 16. The graph labeled Clock represents the output of clock 206. Normally flip-flop 203 is in a state such that no output signal is present at output 204 so that AND gate 205 is unenergized. An input pulse at input terminal 200 causes flip-flop 203 to change state so that a positive output voltage is present at output terminal 204. This positive voltage is coupled to AND gate 205 and the next following clock pulse from clock 206 is gated through AND gate 205 to the input of flip-flop 203 to switch flip-flop 203 back to its original state. This operation is shown on the graph labeled Timing F—F in FIG. 2B. When the clock pulse causes flip-flop 203 to change state, the trailing edge of the output pulse at terminal 204 is coupled to AND gate 207*a* to cause AND gate 207*a* to produce an output pulse. Each succeeding input pulse applied to terminal 200 repeats the operation of flip-flop 203 and AND gate 207*a*. Accordingly, each input pulse produces one output pulse and corresponds to a multiplication of $16\times1$. The output pulses of the first stage of counter 202 are one-half the frequency of the output pulses from flip-flop 203 so that eight output pulses are produced by AND gate 207*b* to correspond to a multiplication of $16\times.5$. Each succeeding stage of counter 202 produces pulses at one-half the frequency of its preceding stage as shown in FIG. 2B. The output pulses of AND gates 207*a*–207*e* are transmitted through OR gate 208 to produce the output pulse train shown in the graph labeled Output in FIG. 2B. This output pulse train is produced at output terminal 209 which corresponds to data flow line 23 of FIG. 1.

The pulse rate multiplier shown in FIG. 2A is merely one example of a pulse rate multiplier that may be used in this invention. Various modifications will be evident to those skilled in the art. For example, the specific embodiment shows an output scheme for taking output signals from counter 202. Counter 202 may be comprised of flip-flops for the various stages and one skilled in the art will recognize that output signals may be taken from either side of the various flip-flops comprising counter 202, however, AND gates 207 may have to be changed so that they trigger on the leading edge of pulses from the counter 202. The only condition imposed is that the output pulses from the AND gates 207 must be spaced in time so that two or more pulses do not occur simultaneously. To keep the number of pulses in a pulse train low the multiplier may be scaled in accordance with principles well known in the art. The patent to Pariser et al., supra, also gives an illustration of scaling. Sign digits to distinguish between positive and negative numbers may be transmitted around the multiplier shown in FIG. 2A and accounted for in the accumulator shown in FIG. 3A. Obviously, the sign digits have no bearing on the magnitude of the product of two numbers and may be accounted for when the product is accumulated.

Figure 3A:
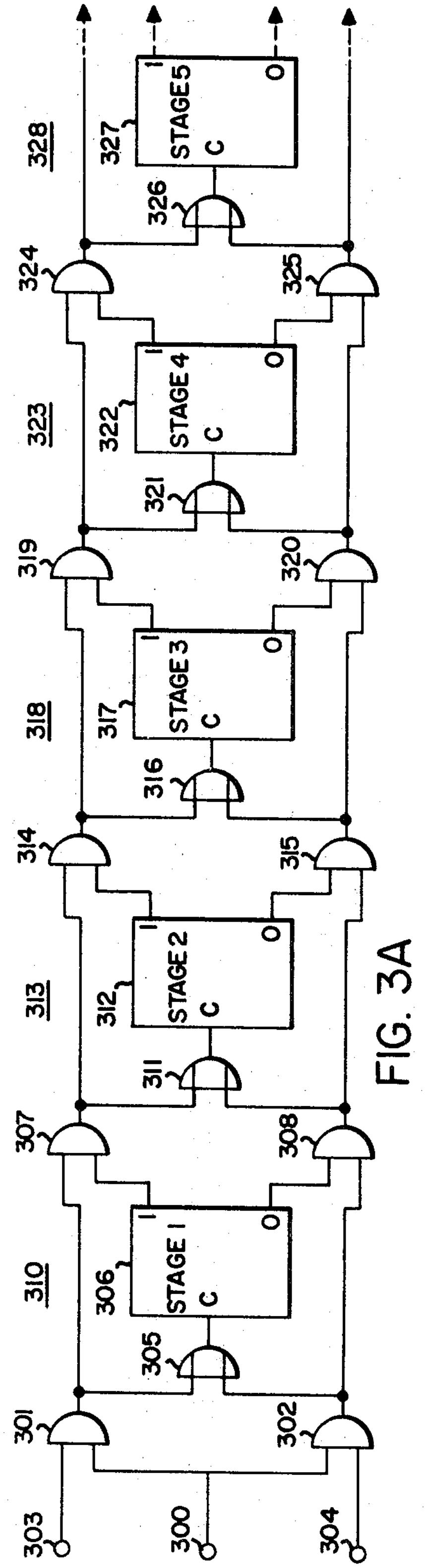
FIG. 3A is a block diagram and logic diagram of a reversible counter used as an accumulator.

Referring to FIG. 3A, there is shown an accumulator that may be used as the accumulator 26 of FIG. 1. Basically, the accumulator is an N stage reversible counter. An input terminal 300 is connected to one input of an AND gate 301 and to one input of an AND gate 302. A second input of AND gate 301 is connected to an input terminal 303 and a second input of AND gate 302 is connected to an input terminal 304. The outputs of AND gates 301 and 302 are connected to inputs of OR gate 305, the output of which is connected to a complementing input of a flip-flop 306 which is labeled stage 1. An output of flip-flop 306 labeled "1" is connected to an input of AND gate 307 and an output of flip-flop 306 labeled "0" is connected to an input of AND gate 308. The output of AND gate 301 is connected to a second input of AND gate 307 and the output of AND gate 302 is connected to a second input of AND gate 308. Flip-flop 306, OR gate 305, and AND gates 301 and 302 comprise a first counter stage 310. Outputs of AND gates 307 and 308 are connected to inputs of an OR gate 311, the output of which is connected to a complementing input of a flip-flop 312 which is labeled stage 2. AND gates 307 and 308, OR gate 311, and flip-flop 312 comprise a second counter stage 313. An output of flip-flop 312 labeled "1" is connected to one input of an AND gate 314, another input of which is connected to the output of AND gate 307. An output of flip-flop 312 labeled "0" is connected to one input of an AND gate 315, another input of which is connected to the output of AND gate 308. An output terminal of AND gate 314 and an output of AND gate 315 are connected to inputs of an OR gate 316, an output of which is connected to a complementing input of flip-flop 317 which is labeled stage 3. AND gates 314 and 315, OR gate 316, and flip-flop 317 comprise a third counter stage 318. An output of flip-flop 317 labeled "1" is connected to one input of an AND gate 319, another input of which is connected to the output of AND gate 314. An output of flip-flop 317 labeled "0" is connected to one input of an AND gate 320, another input of which is connected to an output of AND gate 315. An output of AND gate 319 and an output of AND gate 320 are connected to inputs of an OR gate 321, the output of which is connected to a complementing input of flip-flop 322 which is labeled stage 4. AND gates 319 and 320, OR gate 321, and flip-flop 322 comprise a fourth counter stage 323. An output terminal of flip-flop 322 labeled "1" is connected to one input of an AND gate 324, another input of which is connected to the output of AND gate 319. An output of flip-flop 322 labeled "0" is connected to one input of an AND gate 325, another input of which is connected to the output of AND gate 320. An output of AND gate 324 and an output of AND gate 325 are connected to inputs of an OR gate 326, an output of which is connected to a complementing input of the flip-flop 327. AND gates 324 and 325, OR gate 326, and flip-flop 327 comprise a fifth counter stage 328. In a similar manner the number of stages of the accumulator may be extended as far as necessary or desired with the highest order stage being a sign bit.

Figure 3B:
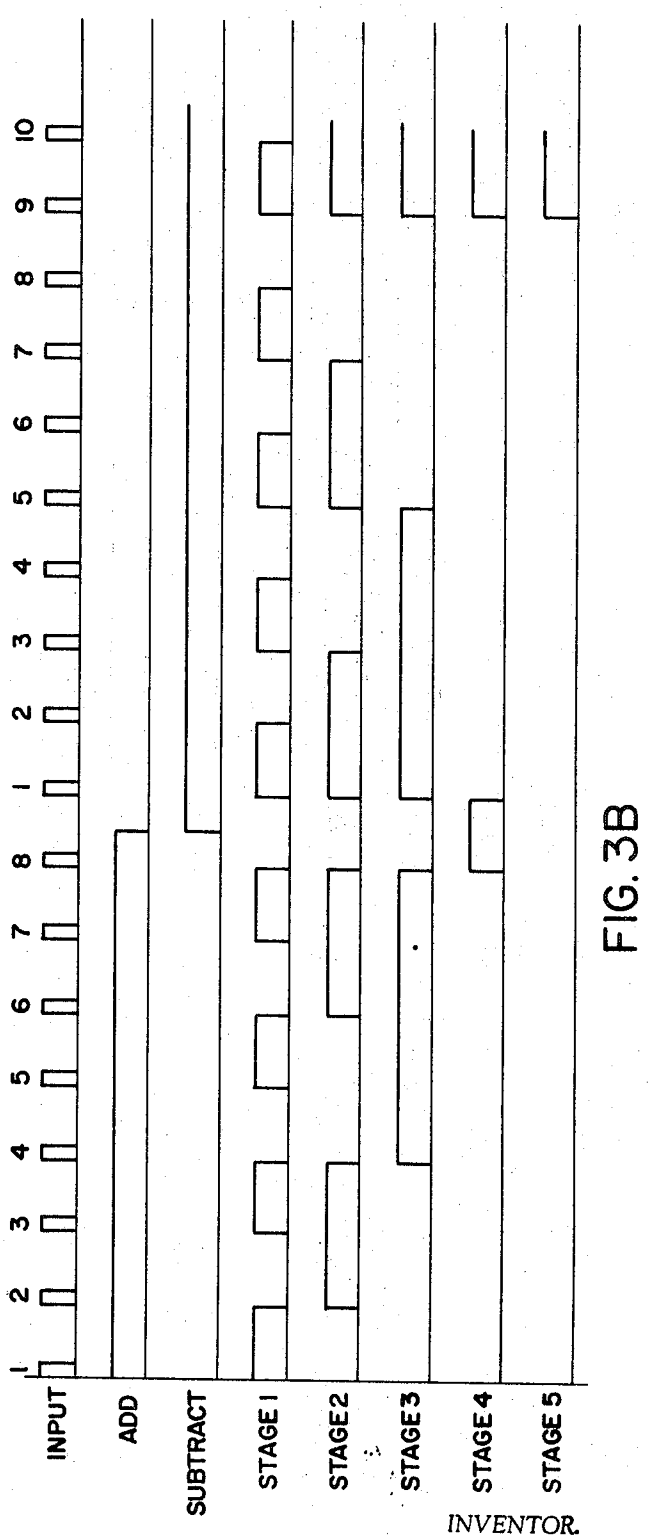
FIG. 3B is a timing diagram to aid in the explanation of FIG. 3A.

The operation of FIG. 3A will be explained with reference to the timing diagram shown in FIG. 3B. FIG. 3B shows a graph labeled Input, a graph labeled Add, a graph labeled Subtract, and various graphs labeled Stage 1–Stage 5. The specific example to be illustrated is accumulating a pulse train representative of the number 8 and the subtracting therefrom the number 10. To accumulate the number 8, which is represented by eight pulses, a positive voltage is applied to terminal 303 which energizes AND gate 301. The first input pulse applied to input terminal 300 is transmitted through AND gate 301 and OR gate 305 to trigger the complement input of flip-flop 306. There is a delay between the time an input pulse is applied at the complementing input until 306 changes state. After this slight delay, flip-flop 306 will switch to a "1" output and AND gate 307 will be energized. The second input pulse causes flip-flop 306 to switch back to a "0" state, however, the delay permits the output pulse from AND gate 301 to be transmitted through AND gate 307 which remains energized until flip-flop 306 changes stage. The output pulse from AND gate 307 is transmitted through OR gate 311 to the complementing input of flip-flop 312 which after a delay switches to a "1" state. This operation is continued for each of the input pulses. As is shown on the timing diagram of FIG. 3B, at the end of eight pulses the output of stage 4 is a "1" and all of the other stages are in a "0" state. The number in the counter corresponds to 1000 in binary or 8 in decimal. At this point, 10 pulses are to be subtracted from the previously stored count of 8. Accordingly, the add signal at terminal 303 is removed and a subtract signal is applied at terminal 304 to energize AND gate 302. The first input pulse to be subtracted is gated through AND gate 302 and OR gate 305 to the complementing input of flip-flop 306. However, due to the delay before flip-flop 306 changes state, the "0" output of flip-flop 306 will keep AND gate 308 energized so that the input pulse will be transmitted through AND gate 308 and OR gate 311 to the complementing input of flip-flop 312. Similarly, the input pulse will be transmitted to the complementing inputs of flip-flops 317 and 322. Flip-flop 322 was originally in the "1" state so that AND gates 325 is unenergized and the input pulse will not be transmitted to flip-flop 327. After the first subtract input pulse, flip-flops 306, 312, and 317 will be in the "1" state and flip-flop 322 will be in the "0" state which corresponds to a count of 7. Similarly, each successive pulse will decrease the count by one until the eighth pulse has reduced the count to zero. The ninth input pulse to be subtracted will then change the state of every flip-flop to a "1" which corresponds to a two's complement represenation of the number —1. The tenth input pulse will change the state of flip-flop 306 to correspond to a count of —2. Thus, it is seen that the accumulator of FIG. 3A performs the operations of addition and subtraction of numbers represented by pulse trains. While no output terminals are shown to provide an output signal from the accumulator, it is obvious that the "1" and "0" outputs of the various stages of the counter are to provide the output signal when a readout is desired.

Figure 4A:
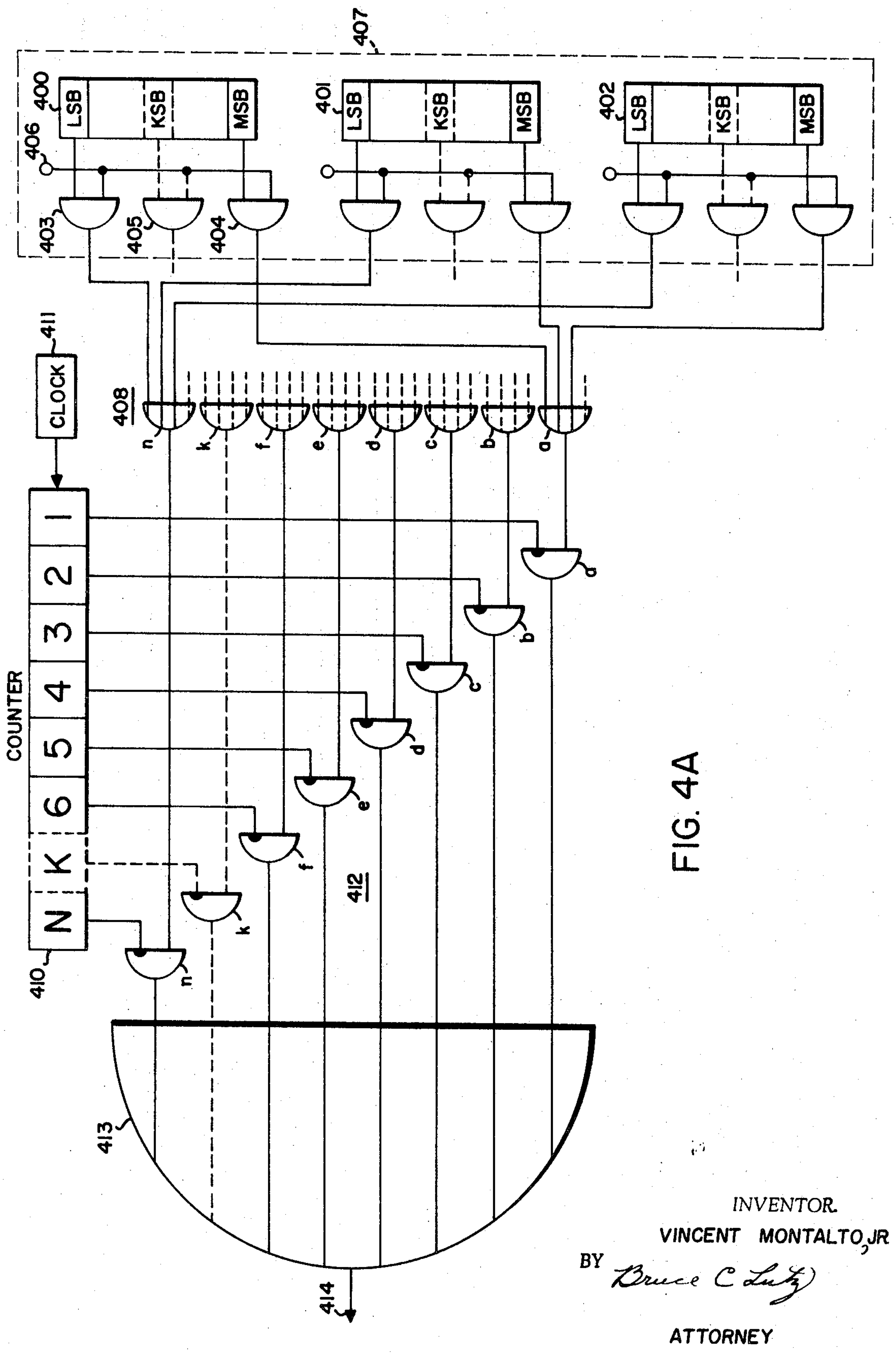
FIG. 4A is a logic diagram of a binary-to-rate converter.

Referring now to FIG. 4A, there is shown a binary-to-rate converter for converting numbers stored in memory registers or cells to pulse trains of equally weighted pulses. Thus, numbers may be stored in memory locations in a binary form for convenience. The applicant does not wish to be limited to any specific memory form because the form that the memory takes is not the essence of this invention. In FIG. 4A there are shown three memory registers 400, 401, and 402, each having a least significant bit (LSB) and a most significant bit (MSB).

It is to be realized that each of the registers may have one additional bit associated with it to take into account a sign bit. The output of the LSB of register 400 is connected to one input of an AND gate 403 and the output of the MSB of register 400 is connected to an AND gate 404, with each intermediate bit being connected to another AND gate of which only the KSB is shown by way of example as being connected to an AND gate 405. An input terminal 406 is connected to a second input of each of AND gates 403, 404, and 405. Similarly, a plurality of AND gates and an input terminal is associated with each of memory locations 401 and 402. Inasmuch as each of the memory locations operates in an identical manner, only the memory location 400 and its associated AND gates will be explained in detail. The AND gates and the memory location are enclosed in dotted lines 407 to represent that these components may be part of either memory 36 or memory output register 38. An output of AND gate 403 is connected to one input of an OR gate 408*n* and an output of AND gate 404 is connected to one input of an OR gate 408*a*. As was explained above, a series of AND gates are connected to the various bits intermediate the LSB and MSB of memory location 400. An output from each of these AND gates is connected to one of OR gates 408*b*, *c*, *d*, *e*, *f*, and *k* with OR gate 408*k* representing the number of OR gates necessary to make the total number of OR gates 408 equal to the number of bits in a memory location. Corresponding connections between the AND gates associated with memory locations 401 and 402 are shown as being connected to second and third inputs of OR gate 408 which corresponds to connections to various other memory locations not shown. The connections shown in FIG. 4A and described thus far would correspond to a direct readout from memory 36 of FIG. 1 to OR gates 408. If the number of memory locations in memory 36 is large, the circuitry would be unduly duplicated so that the total amount of circuitry would become unreasonable. In that event, a memory output register 38 may be interposed between memory 36 and OR gates 408 whereby information is read out of memory 36 into a memory output register or set of memory output registers, for example, registers 400, 401, and 402. In some cases only one output register is necessary and in those cases OR gates 408 may be omitted from the circuit. To read data from memory location 400, a signal is applied to input terminal 406 by the program controller unit 45. This signal energizes each of AND gates 403, 404, and 405 so that an output signal corresponding to "1" and "0" bits stored in memory location 400 is produced by AND gates 403, 404, and 405. These output signals are passed through OR gates 408. Similarly, if it is desired to read data from memory location 401, its associated AND gates are energized to provide output signals to OR gates 408.

There is further shown a counter 410 which has N stages. The number of stages of counter 410 corresponds to the number of bit locations in the memory registers. A clock 411 provides output pulses to counter 410. Counter 410 and clock 411 may be included as part of program controller unit 45. The output from stage 1 of counter 410 is connected to one input of an AND gate 412*a*, the other input of which is connected to OR gate 408*a*. Similarly, two inputs to an AND gate 412*b* are connected, one to the second stage of counter 410 and the other to an output of OR gate 408*b*. Similarly, AND gates 412*c*, *d*, *e*, *f*, *k*, and *n* are connected to corresponding stages of counter 410 and OR gates 408. An output of each of AND gates 412 is connected to an input of OR gate 413. An output of OR gate 413 is connected to terminal 414 which corresponds to data flow lines 41 and 42 of FIG. 1. AND gates 412 are pulsed AND gates similar to those described in connection with FIG. 2A.

Figure 4B:
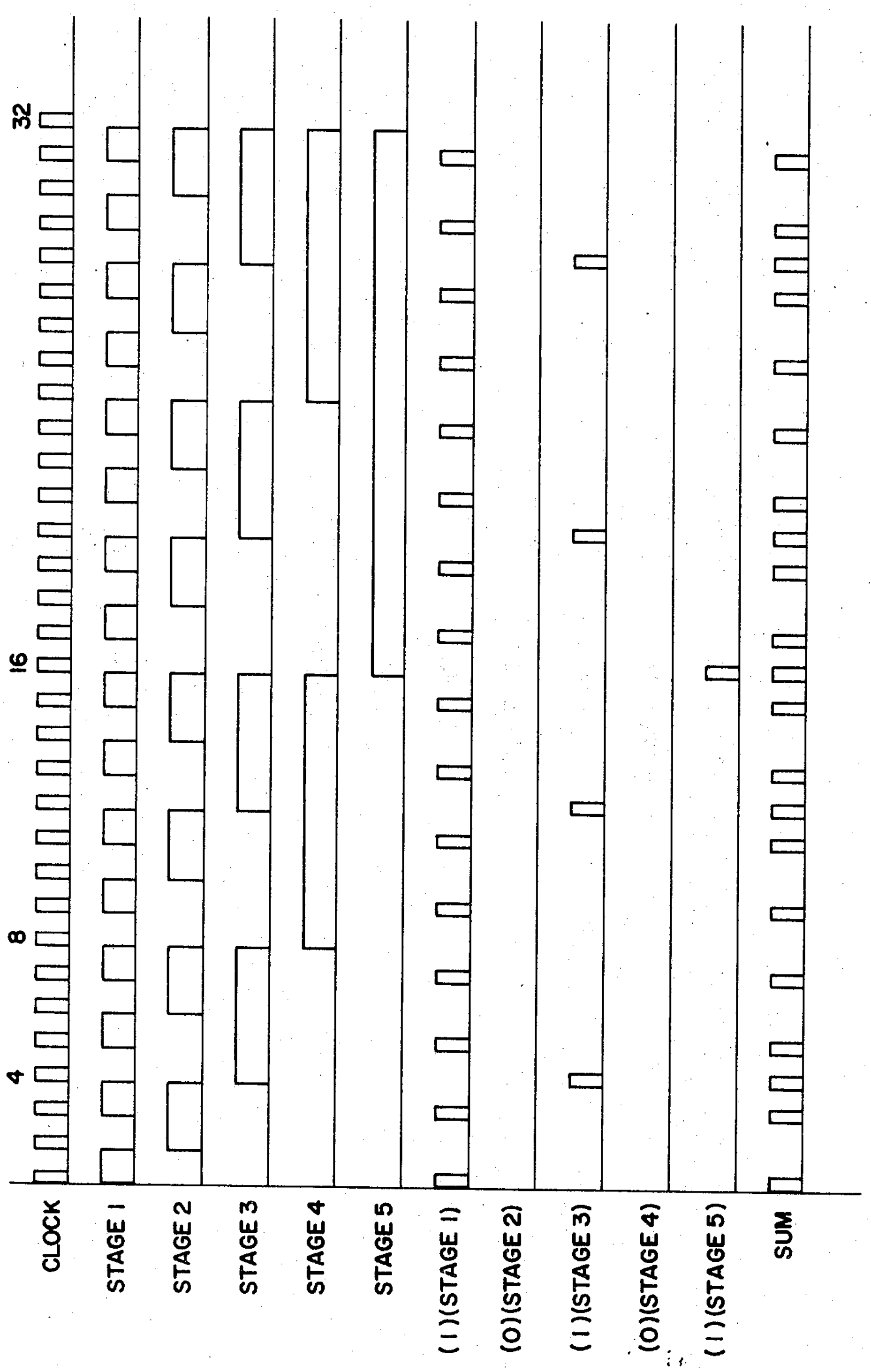
FIG. 4B is a timing diagram to aid in the explanation of FIG. 4A.

FIG. 4B shows a timing diagram for a specific example of a binary number to be read out of memory location 400. Assume that the number 21 which equals 10101 in binary notation is stored in memory location 400 and further assume that there are only five bits in each memory location. A signal from program controller unit 45 will energize the AND gates 403, 404, and 405. Output signals from the first, third, and fifth AND gates associated with memory location 400 will be produced corresponding to the "1" bits stored in memory location 400. Thus, the OR gates 408*a*, *c*, and *e* will be energized and OR gates 408*b* and *d* will not be energized. Upon the occurrence of the first clock pulse from clock 411, the first stage of counter 410 will be set and AND gate 412*a* will produce an output pulse. The second clock pulse from clock 411 will reset the first stage of counter 410 and will set the second stage. However, AND gate 412*b* is not energized from OR gate 408*b* and no output pulse will be produced. The third pulse from clock 411 will set the first stage of counter 410 and another pulse will be produced by AND gate 412*a*. Similarly, the fourth pulse from clock 411 will set stage 3 of counter 410 and reset stages 1 and 2. AND gate 412*c* is energized from OR gate 408*c* so that an output pulse is produced by AND gate 412*c*. From this description and from FIG. 4B it is obvious that 21 pulses will be produced by AND gates 412. These pulses are transmitted through OR gate 413 to provide a pulse train of 21 pulses at output terminal 414. It should be realized that the description of the operation of FIG. 4 was made as if only 5 bit locations were in memory register 400 and only 5 OR gates 408 and 5 AND gates 412 were present. Various modifications of the binary-to-rate converter will be obvious to those skilled in the art.

FIG. 5A shows a portion of a circuit that may be used for the program controller unit 45 to produce relative timing for the computer operations. FIG. 5A shows a clock 500 connected to the first stage of a micro-counter 501. There is further shown a macro-counter 502 consisting of stages A, B, C, and D. Counter 501 is called a micro-counter because it counts each clock pulse. Counter 502 is called a macro-counter because it counts the cycles of micro-counter 501. The macro-counter need not be restricted to four stages. A reset output R of stage 2 of micro-counter 501 is connected to a reset input R of stage A of macro-counter 502. A reset output R of stage N or the highest order stage of micro-counter 501 is connected to a set input S of stage A of macro-counter 502. An output terminal of stage A of macro-counter 502 is connected to one input terminal of an OR gate 503, the output terminal of which is connected to micro-counter 501. The reset output R of stage N of micro-counter 501 is connected to a second input terminal of OR gate 503 and is further connected to one input terminal of an OR gate 504, the output terminal of which is connected to stage B of macro-counter 502. The "1" output of stage D of macro-counter 502 is connected to a second input terminal of OR gate 504.

The operation of FIG. 5A will be explained in conjunction with the timing diagrams shown in FIG. 5B and FIG. 5C. The first pulse from clock 500 causes stage 1 of the micro-counter 501 to set and the second pulse from clock 500 causes stage 1 to reset, setting stage 2. Stage 1 is set by the third pulse from clock 500 and the fourth pulse resets both stage 1 and stage 2, setting stage 3 of micro-counter 501. When stage 2 is reset, an output pulse is applied to stage A of macro-counter 502 causing stage A, which was originally set, to reset, generating an output pulse from stage A to OR gate 503. The output pulse from stage A is transmitted through OR gate 503 to provide a signal to micro-counter 501 which causes stage 3 to reset. The above operation is termed a minor cycle of micro-counter 501. Counter 501 now counts until all stages are set, including the N or highest order stage. The next clock pulse from clock 500 causes all stages to reset generating an output pulse from stage N at its reset output. This output pulse is ored by OR gate 503 to provide a reset signal to micro-counter 501 which assures that every stage is finally reset. The rest output from stage N of micro-counter 501 sets stage A of macro-counter 502 and is also applied to OR gate 504. The reset pulses from stage N are counted by stages B, C, and D of macro-counter 502. Stages B, C, and D of macro-counter 502 operate as a normal counter except that stage B starts from a set position. The interval between the pulses applied to stages B, C, and D of macro-counter 502 is termed a major cycle. The operation of a major cycle is shown in FIG. 5C, where seven such major cycles are shown. Each minor cycle is illustrated by a narrow pulse on the graph labeled A. At the end of the seventh major cycle, stage D of macro-counter 502 is reset which provides an output pulse to OR gate 504 setting stage B. Thus, at the end of seven major cycles, the micro-counter 501 and the macro-counter 502 are in their original condition. Output signals may be taken from each of the N stages of micro-counter 501 and of the four stages of macro-counter 502 and combined in OR and AND gates, not shown, to provide various combinations of signals to energize the various portions of the circuit at appropriate times. The circuit shown in FIG. 5A is merely one example of circuitry that may be used for program controller unit 45.

Referring now to FIG. 1, assume that an analog input signal is present on data flow line 11. Pulse width modulator 12 provides output pulses on data flow line 13 of a width proportional to the amplitude of the analog signal. These pulse width modulated pulses energize AND gate 14 to permit clock pulses from clock 15 to be applied to input control gates 16. The number of clock pulses from clock 15 that are passed through AND gate 14 depends upon the width of the pulses from pulse width modulator 12 and hence, on the amplitude of the analog input signal. Obvously, this circuitry may be dispensed with if the input signal is in the form other than analog, for example, a pulse train of equally weighted pulses. If the input signal is a binary number signal, a binary-to-rate converter may be used to convert the binary number to a pulse train. Alternatively, appropriate logic circuitry could be used to introduce a binary number signal into the feedback loop to be converted to a pulse train by binary-to-rate converter 40. The program controller unit energizes the pulse width modulator 12 and the input control gates 16 to gate the input signal to pulse rate multiplier 21. Pulse rate multiplier 21 multiplies the input signal by a number generated by multiplier coefficient matrix 48 in accordance with a control signal from program controller unit 45. The output signal from pulse rate multiplier 21 is applied via data flow line 23 to control gates 24. Control gates 24 control the direction of counting of the accumulator 26 to account for the sign of the two numbers multiplied by pulse rate multiplier 21. From FIG. 3B it is obvious that accumulator 26 represents numbers in two's complement notation, however, this is not the most satisfactory representation for this type of computer. Accordingly, when a negative number occurs in accumulator 26, the sign information is transmitted by a control line 27 to control gates 24. Control gates 24 then generate a signal to subtract one and complement the number in accumulator 26 which results in a magnitude and accompanying sign bit representation of numbers in the accumulator. Transfer gates 29, when energized by program controller unit 45, transfer a number from accumulator 26 to memory 36. As was explained in connection with FIG. 4A, the memory 36 may be combined with a memory output register 38 to decrease the total amount of circuitry if a large number of storage locations are used. At an appropriate time, memory 36 and memory output register 38 are energized to provide output signals on data flow line 39 which are converted by binary-to-rate converter 40 to a pulse train of unweighted pulses. These pulses are gated through input control gate 16 for further computations thereon. At the completion of all computations, a number in the accumulator 26 will be gated through transfer gates 29 to output unit 31. The output signal produced on data flow line 32 will depend upon the type of output desired. If a binary number output is desired, a direct readout from accumulator 26 may be sufficient. If a pulse rate signal is desired, output unit 31 may consist of a binary-to-rate converter, however, in this case, the data from accumulator 26 may be transmitted through memory 36 and memory output register 38 to binary-to-rate converter 40 to provide an output signal at output 41. Alternatively, an output signal may be taken from data flow line 22 or directly from pulse rate multiplier 21. Output unit 31 may also consist of a digital-to-analog converter, which may be a scheme of weighted resistors. Obviously, various alternatives are possible for all of the circuitry shown.

To further illustrate the operation and advantages of this invention, I will use a general equation which represents a sampled proces, and solve it as an example of the operation of FIG. 1. However, it is to be understood that the scope of my invention is not to be limited in any way by the example chosen. The Z-transform $$\frac{e_0(z)}{e_1(z)}=\frac{\sum_{n=0}^{N} a_n z^{-n}}{1+\sum_{n=1}^{M} b_n z^{-m}} \quad (1)$$

where $z=e^{ts}$ and T is the sampling interval, describing this process, may be transformed to a finite difference equation of the form $$e_0(kt)=A_0e_1(kt)+A_1e_1[(k-1)T]+\ldots+A_ne_1[(k-n)T] \frac{-B_1e_0[(k-1)T]}{B_0} - \frac{B_2e_0[(k-2)T]}{B_0}\ldots-\frac{B_me_0[(k-m)T]}{B_0} \quad (2)$$

where $e_1[(k—n)T]$ is the discrete input at the $(k—n)$th sampling period and $e_0[(k—m)T]$ is the discrete output at the $(k-n)$th sampling period. By defining a new variable $$V_k=\frac{e_1(kT)-B_1V_{k-1}-B_2V_{k-2}-\ldots-B_mV_{k-m}}{B_0} \quad (3)$$

storage requirements of the computer may be reduced. The equation to be solved is reduced to $$e_0(kT)=A_0V_k+A_1V_{k-1}+A_2V_{k-2}+\ldots+A_nV_{k-n} \quad (4)$$

Equation 1 represents a general form of the $n$th order system. For purpose of illustration, a second order system will be discussed (i.e. $n=m=2$) and $B_0$ is set to unity. Then Equation 3 reduces to $$V_k=e_1(kT)-B_1V_{k-1}-B_2V_{k-2} \quad (5)$$

and Equation 4 reduces to $$e_0(kT)=A_0V_k+A_1V_{k-1}+A_2V_{k-2} \quad (6)$$

If $E_k$ is the $k$th discrete output, $$E_k=e(kT)-B_1V_{k-1}-B_2V_{k-2}+A_1V_{k-1}+A_2V_{k-2} \quad (7)$$

Referring now to FIG. 1, assume that the program controller unit 45 is programed to control the operation of the various blocks to solve Equations 5 and 7. Assume that $V_{k-1}$ is stored in memory location 2 of memory 36. The value of $V_{k-2}$ is read from memory location 3 of memory 36 and converted to a pulse train by binary-to-rate converter 40. The pulse train representing $V_{k-2}$ is multiplied by $A_2$, which is generated by the multiplier coefficient matrix 48, in the multiplier 21 and accumulated in the accumulator 26. Similarly, $V_{k-1}$ is read from memory location 2 and multiplied by $A_1$. The sum of $A_2V_{k-2}$ and $A_1V_{k-1}$ is accumulated in accumulator 26 and placed in memory location 1 of memory 36. Accumulator 26 is cleared and the product $-B_2V_{k-2}$ is accumulated. Next, $-B_1V_{k-1}$ is formed in multiplier 21 and added to $-B_2V_{k-2}$ in accumulator 26. The post value $V_{k-2}$ is no longer required so $V_{k-1}$ is transferred to memory location 3 destroying $V_{k-2}$. Next the pulse-width modulator 12 is activated and the input value $e(kT)$ is digitized and multiplied by 1 in multiplier 21 and added to $-B_1V_{k-1}-B_2V_{k-2}$ to form $V_k$ which is placed in memory location 2. The number $A_1V_{k-1}+A_2V_{k-2}$ is read from memory 36 and multiplied by 1 in the multiplier 21 and added to the number in the accumulator 26. The number in the accumulator 26 represents $E_k$ of Equation 7. During the next sample period, $V_k$ becomes $V_{k-1}$ and $V_{k-1}$ becomes $V_{k-2}$. The number $E_k$ may now be read out by output unit 31 or transmitted to memory 36 as is desired. This example gives one illustration of an equation that may be solved, however, many other forms of equations may also be solved by this invention.

I do not wish to be limited to the specific embodiment shown and described herein. Many modifications of the circuitry will be obvious to those skilled in the art. For example, no provisions are made for division, however, division may be accomplished by multiplying one number by the reciprocal of another number which could be accounted for in the control circuitry. This invention is directed toward the organization of a pulse rate computer, accordingly, I wish to be limited only by the scope of the appended claims.

I claim:

1. Computing apparatus characterized by the representation of numbers by pulse trains of equally weighted pulses comprising, in combination:
input means for providing a pulse train representation of an analog voltage;
multiplying means for multiplying the pulse train by a binary coded multiplier;
means connected to said multiplying means for supplying the binary coded multiplier;
first gating means connected to said input means and further connected to said multiplying means;
accumulating means including reversible counting means for counting the number of pulses in a pulse train;
second gating means connected to said multiplying means to receive pulse trains therefrom, said second gating means being further connected to said accumulating means to supply pulse trains thereto;
storage register means for storing binary numbers;
third gating means connected to said accumulating means and further connected to said storage register means;
output means connected to said third gating means for transferring binary numbers from said accumulating means alternatively to said storage register means and said output means;
converter means for converting binary numbers applied thereto to pulse trains, said converter means being connected to said storage register means and to said first gating means to supply pulse trains thereto, said first gating means operating to select between signals from said input means and said converter means; and
control means connected to each of said gating means to energize said gating means and to provide relative timing and further connected to provide supervisory control of the computing apparatus.

2. Computing apparatus characterized by the representation of numbers by pulse trains of equally weighted pulses comprising, in combination:
control means;
multiplying means for multiplying a pulse train by a binary coded multiplier;
generating means connected to said multiplying means and further connected to said control means for generating binary coded multipliers, said control means energizing said generating means to produce binary coded multipliers at appropriate time intervals;
accumulating means including reversible counting means;
first gating means connected to said multiplying means, to said accumulating means, and to said control means, said first gating means operating in response to signals from said control means to gate signals from said multiplying means to said accumulating means and further operating to control the direction of counting of said counting means;
binary data storage means having output means;
apparatus output means;
second gating means connected to said accumulating means, to said binary data storage means, to said apparatus output means, and to said control means, said second gating means operating to transfer binary numbers from said accumulating means alternatively to said storage means and said apparatus output means in accordance with signals from said control means;
converting means for converting binary numbers to pulse trains;
means connecting said output means of said storage means to said converting means and to said control means, said output means of said storage means operating to transfer binary numbers from said storage means to said converting means in response to signals from said control means;
input means for providing pulse trains of input information; and
fourth gating means connected to said input means, to said converting means, to said multiplying means, and to said control means, said fourth gating means operating to alternatively connect said input means and said converting means to said multiplying means in response to signals from said control means.

3. Apparatus of the class described comprising, in combination
computing means for performing computing operations on a pulse train of equally weighted pulses;
input means connected to said computing means through gates which, when energized, gate a pulse train to said computing means;
output means connected to said computing means, said output means providing output signals at appropriate times, said output signals being representative of the input pulse train operated on by said computing means;
storage means connected to said computing means, said storage means operating to store partial results from said computing operations performed by said computing means, said partial results being stored in binary notation;
converting means for converting binary numbers to pulse trains of equally weighted pulses, said converting means being connected between said storage means and said computing means to convert stored binary numbers to pulse trains; and
control means connected to said computing means, to said storage means, to said converting means, and to said input and output means, said control means for generating signals to control the operation of the computing apparatus.

4. Apparatus of the class described comprising, in combination:
computing means including pulse rate multiplying means for multiplying a pulse train by a binary coded multiplier and accumulating means, said multiplying means being arranged for multiplying a number represented by a pulse train by a number represented in binary notation, said accumulating means including reversible counting means, and said counting means providing an output signal representative of a number in binary notation;
program control means connected to said computing means to establish supervisory control of the relative timing of operation for converting the pulse train to a binary number;
input means connected to said computing means for providing input pulse trains;
data storage means having a large number of storage location for storing binary numbers;
first means connecting said counting means to said data storage means, said first means operating to transfer binary numbers from said counting means to said data storage means; and
second means connecting said data storage means to said computing means, said second means operating to convert binary numbers to pulse trains of equally weighted pulses.

5. Apparatus in which numbers are represented by pulse trains of equally weighted pulses comprising, in combination:
computing means comprising a pulse rate multiplier and an accumulator for performing computations on pulse trains of equally weighted pulses;
feedback means connected to said computing means, said feedback means comprising a binary to rate converter for receiving binary numbers representing partial results of the computations and for returning said numbers to said computing means for further computations, said feedback means including data storage means having plural storage locations for storing simultaneously said numbers representing partial results; and control means connected to said computing means and to said feedback means, said control means for controlling the relative timing of the computing apparatus.

6. A computer, comprising, in combination:

programmable pulse rate computing means comprising a pulse rate multiplier for performing computations on pulse train input data in accordance with a preconceived program;

feedback means connected to an output means of said computing means, said feedback means including data storage means having plural storage locations, said feedback means being arranged for receiving partial results from said computing means and for storing said partial results in said plural stations of the data storage means; and transfer means connected to said feedback means and further connected to said computing means, said transfer means being connected for receiving said partial results from said data storage means and for transferring said partial results to said computing means for further computations thereon.

7. A computer in which numbers are represented by pulse trains of equally weighted pulses comprising, in combination:

pulse rate multiplying means;

accumulating means including reversible counting means;

program control means connected to said accumulating means and to said multiplying means;

means connecting said multiplying means to said accumulating means;

storage means for storing binary numbers;

first means connecting said counting means to said storage means, said first mean being further connected to said program control means whereby said first means, when activated by said program control means, transfers numbers from said counting means to said storage means;

second means connecting said storage means to said multiplying means, said second means being further connected to said program control means whereby said second means, when activated by said program control means, converts binary numbers stored in said storage means to pulse trains for further computations thereon by said multiplying means and said accumulating means; and input means connected to said multiplying means.

8. In computing apparatus in which numbers are represented by pulse trains of equally weighted pulses comprising, in combination:

computing means comprising a pulse rate counter with a single computing section and having an input means for receiving input pulse trains and also having output means;

storage means having plural storage locations;

first means connecting said storage means to said output means of said computing means for transferring partial results of computations by said computing means from said output means thereof to said storage means; and second means connecting said storage means to said input means for transferring said partial results from the plural stations of said storage means to said input means.

9. Computing apparatus in which numbers are represented by pulse trains of equally weighted pulses comprising, in combination:

a pulse rate multiplier;

an accumulator including a reversible counter;

means connecting said multiplier to said accumulator;

program control means connected in controlling relationship with said multiplier and said accumulator;

binary number storage means having plural number of storage locations;

first means connecting said accumulator to said storage means for transferring plural numbers from said accumulator to said storage means;

second means connecting said storage means to said multiplier for transferring numbers from said storage means to said multiplier; and input means for receiving pulse trains connected to said multiplier.

10. A computer in which numbers are represented by pulse trains of equally weighted pulses comprising, in combination:

computing means for performing the functions of multiplying and accumulating;

input means connected to said computing means for applying pulse trains thereto;

feedback means connected to said computing means for retaining at a number of storage locations partial results of plural calculations performed by said computing means and for retransmitting said partial results to said computing means for the performance of further calculations thereon;

output means connected to said computing means; and control means connected to said computing means and to said feedback means to control the operation thereof.

11. Computing apparatus in which numbers are represented by pulse trains of equally weighted pulses comprising, in combination:

computing means having input and output means;

feedback means connected to said input means and to said output means of said computing means, said feedback means operating to receive partial results of computations by said computing means and to transmit said partial results to said computing means at the appropriate times for further computations thereon; and control means connected to said computing means and to said feedback means to control the relative timing of operation.

12. Computing apparatus comprising, in combination:

computing means for performing computations on numbers represented by pulse trains of equally weighted pulses;

input means connected to said computing means;

output means connected to said computing means;

data storage means;

first transfer means connecting said computing means to said data storage means, said first transfer means operating to transfer numbers from said computing means to said data storage means; and second transfer means connecting said computing means to said data storage means, said second transfer means operating to transfer numbers from said data storage means to said computing means.

13. A computer in which numbers are represented by pulse trains of equally weighted pulses comprising, in combination:

computing means having input and output means;

binary storage means having a large number of storage locations;

gating means connecting said output means of said computing means to said storage means for transferring data from said output means to said storage means;

means connected to said gating means for activating said gating means;

converting means for converting stored data in said storage means locations to pulse trains;

means connecting said storage means to said converting means; and means connecting said converting means to said input means.

14. Computing apparatus in which numbers are represented by pulse trains of equally weighted pulses comprising, in combination:

computing means having input and output means;

feedback means having data retention means providing a large number of storage locations for the retention of partial results of plural computations by said computing means;

first means connecting said output means to said feedback means; and second means connecting said feedback means to said input means.

References Cited

UNITED STATES PATENTS

| | | | |
|---|---|---|---|
| 2,910,237 | 10/1959 | Meyer et al. -------- | 235—150.3 |
| 2,913,179 | 11/1959 | Gordon ---------- | 235—150.2X |
| 3,230,353 | 1/1966 | Greene et al. ---- | 235—150.3X |
| 2,951,202 | 8/1960 | Gordon ---------- | 235—150.3X |
| 3,277,381 | 10/1966 | Sullivan ----------- | 235—156X |
| 3,346,728 | 10/1967 | Brodhead, Jr. ----- | 235—165X |

MALCOLM A. MORRISON, Primary Examiner

J. F. RUGGIERO, Assistant Examiner

U.S. Cl. X.R.

235—150.52